United States Patent
Hehenberger

(10) Patent No.: US 8,500,434 B2
(45) Date of Patent: Aug. 6, 2013

(54) DEVICE FOR GRANULATING PLASTIC

(75) Inventor: Gerhard Hehenberger, Eggendorf (AT)

(73) Assignee: ECON GmbH, Weisskirchen/Traun (AT)

( * ) Notice: Subject to any disclaimer, the term of this patent is extended or adjusted under 35 U.S.C. 154(b) by 0 days.

(21) Appl. No.: 13/396,914

(22) Filed: Feb. 15, 2012

(65) Prior Publication Data

US 2012/0207870 A1 Aug. 16, 2012

(30) Foreign Application Priority Data

Feb. 16, 2011 (AT) .................................. A 200/2011

(51) Int. Cl.
*B26D 7/26* (2006.01)
*B29B 9/06* (2006.01)

(52) U.S. Cl.
USPC .... 425/192 R; 425/186; 425/307; 425/451.5; 425/451.7; 425/DIG. 129

(58) Field of Classification Search
CPC ...... B26D 7/26; B26D 7/2614; B26D 7/2621; B29B 9/06; B29B 9/065
USPC ..................... 425/67, 68, 70, 71, 186, 192 R, 425/310, 311, 313, 382.3, 382.4, 307, 450.1, 425/451.7, 451.9, DIG. 129
See application file for complete search history.

(56) References Cited

U.S. PATENT DOCUMENTS

| | | | | |
|---|---|---|---|---|
| 2,333,059 A * | 10/1943 | Tucker | ............................ | 264/161 |
| 2,698,963 A * | 1/1955 | McDermott | ..................... | 425/69 |
| 3,196,483 A * | 7/1965 | Eyles | ............................. | 425/311 |
| 3,230,582 A * | 1/1966 | Hoffman et al. | ................. | 425/67 |
| 3,266,090 A * | 8/1966 | Gosney | ............................. | 425/67 |
| 3,355,767 A * | 12/1967 | Niemeyer | ...................... | 425/313 |
| 3,517,414 A * | 6/1970 | Carson, Jr. | ....................... | 425/86 |
| 3,599,285 A * | 8/1971 | Hamilton | ....................... | 425/307 |
| 3,624,830 A * | 11/1971 | Stehower et al. | ............... | 99/510 |
| 3,792,950 A * | 2/1974 | Cuff | ............................... | 425/313 |
| 4,249,879 A * | 2/1981 | Anders et al. | .................. | 425/311 |
| 4,300,877 A | 11/1981 | Andersen | | |
| 4,321,026 A * | 3/1982 | Lambertus | ..................... | 425/142 |
| 4,614,307 A * | 9/1986 | Lauser | ........................ | 241/101.4 |
| 4,710,113 A * | 12/1987 | Voigt | ............................... | 425/67 |
| 5,223,279 A | 6/1993 | Lambertus | | |
| 5,866,177 A * | 2/1999 | Ingram | ........................ | 425/297 |
| 6,261,078 B1* | 7/2001 | Martin | ....................... | 425/192 R |
| 6,537,050 B1* | 3/2003 | Kasai et al. | ...................... | 425/67 |

(Continued)

FOREIGN PATENT DOCUMENTS

DE 41 16 933 11/1992

*Primary Examiner* — Seyed Masoud Malekzadeh
(74) *Attorney, Agent, or Firm* — Collard & Roe, P.C.

(57) ABSTRACT

A device is described for granulating plastic having a granulating head (1) and having a drivable cutter head (4), which cooperates with a perforated plate (2) and is arranged inside a housing (3), and which is movable along an axial guide made of guide spars (7) and guide sleeves (8), which are displaceable on the guide spars (7), and is attachable to the granulating. head (1) via locking units (9). In order to provide advantageous design conditions, it is proposed that the locking units (9) comprise latching wedges (11) mounted so they are displaceable transversely to the guide sleeves (8), which penetrate the guide sleeves (8) and the guide spar (7) in oblong holes (12, 13) in the locking position and are supported in the direction of the spar axis on one side on the guide sleeve (8) and on the other side on the guide spar (7).

3 Claims, 3 Drawing Sheets

U.S. PATENT DOCUMENTS

Figure 1:
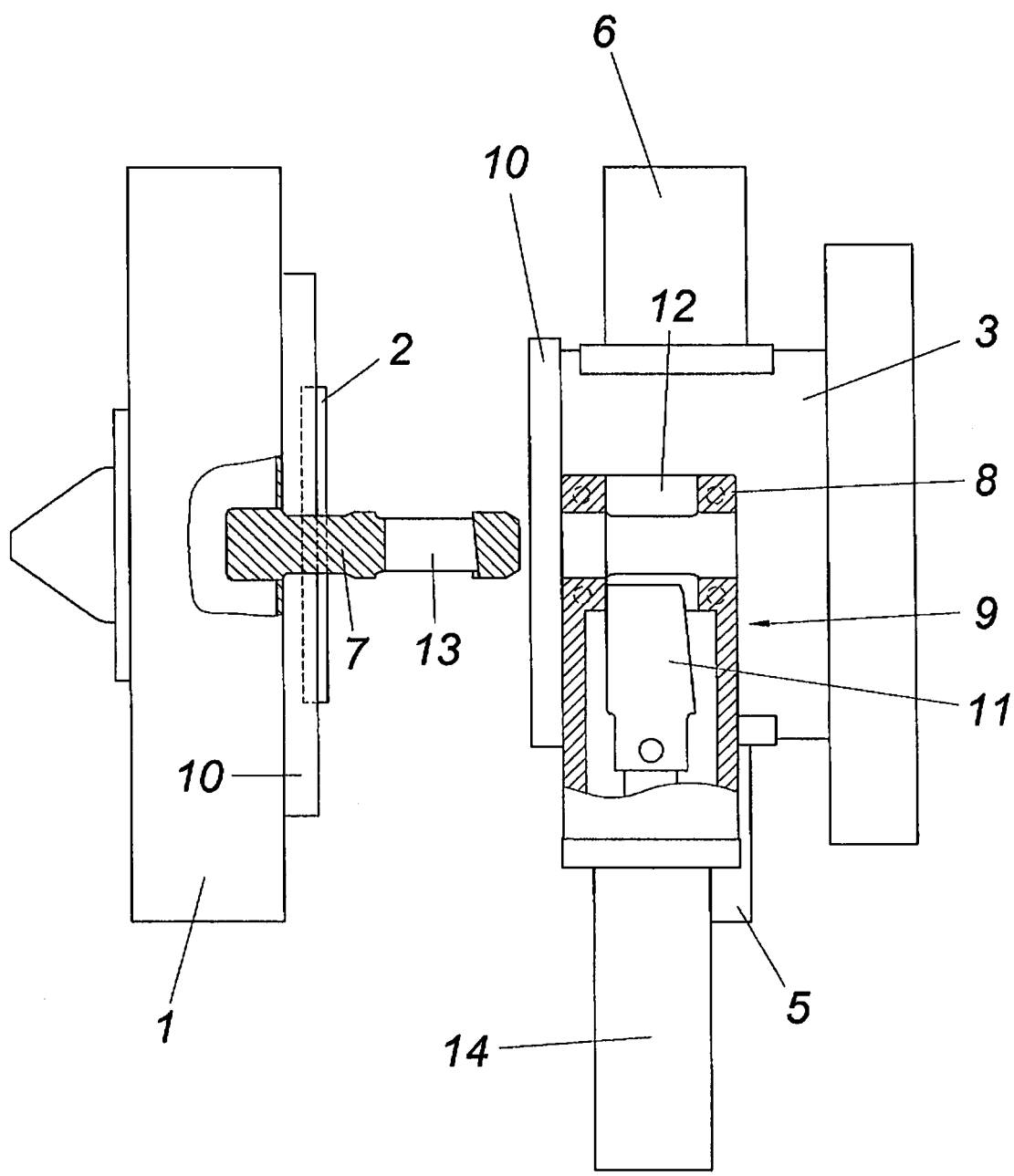

| | | | |
|---|---|---|---|
| 6,824,371 B2* | 11/2004 | Smit | 425/67 |
| 7,007,559 B2* | 3/2006 | Klammer et al. | 73/862.08 |
| 7,172,397 B2* | 2/2007 | Fridley | 425/70 |
| 2003/0031742 A1* | 2/2003 | Smit et al. | 425/67 |
| 2004/0081716 A1* | 4/2004 | Eloo et al. | 425/67 |
| 2005/0106277 A1* | 5/2005 | Fridley | 425/67 |
| 2009/0269571 A1* | 10/2009 | Takaoka | 428/222 |

* cited by examiner

DEVICE FOR GRANULATING PLASTIC

CROSS REFERENCE TO RELATED APPLICATIONS

Applicant claims priority under 35 U.S.C. §119 of Austrian Application No. A 200/2011 filed on Feb. 16, 2011, the disclosure of which is incorporated by reference.

The invention relates to a device for granulating plastic having a granulating head and having a drivable cutter head, which cooperates with a perforated plate and is arranged inside a housing, and which is displaceable along an axial guide made of guide spars and guide sleeves, which are movable on the guide spars, and is attachable via locking units to the granulating head.

Devices for granulating plastic have a granulating head, in which the plastic melt conveyed from an extruder via a diverter valve is divided into a plurality of strands, which exit with the aid of dies through a perforated plate mounted upstream from the granulating head into a housing, in which a cutter head is mounted. The melt strands exiting from the perforated plate are cut into a granulated material by the cutters, which engage on the perforated plate, of the cutter head rotating coaxially to the perforated plate, the granulated material solidifying in a cooling and conveyor medium flowing through the housing and being conveyed with the cooling and conveyor medium out of the housing, before it is separated from the cooling and conveyor medium, which is typically guided in a circuit. Air and water are used in particular as the cooling and conveyor media, inter alia, as a function of the plastic used. Independently of the respectively used cooling and conveyor medium, the danger exists that melt solidifying in the area of the perforated plate will collect and impair the passage of the melt strands through the perforated plate, so that the perforated plate is to be accessible for maintenance work. If the housing having the cutter head is flanged onto the granulating head, the access to the perforated plate, which is typically assigned to the granulating head, is connected with substantial work effort.

In order that the cutter head can be removed with little effort from the granulating head, providing guide spars on the diverter valve, which carries the granulating head, is known (DE 41 16 933), on which a flange for mounting the cutter head and the drive motor for the cutter head drive is mounted so it is axially displaceable via guide sleeves. Since the bearing flange is attached with. the aid of quick-release fasteners on spacers of the diverter valve, it can be axially displaced away from the granulating head along the guide spars after the opening of the quick-release fasteners. However, the design expenditure is disadvantageous, which results from an elastic support of the guide spars on the side opposite to the diverter valve. In addition, quick-release fasteners in the form of clamping levers are hardly suitable for automation.

The invention is therefore based on the object of improving the access to the perforated plate of a granulating device using simple design means. In addition, the requirements for simple automation are to be provided.

Proceeding from a device for granulating plastic of the type mentioned at the beginning, the invention achieves the stated object in that the locking units comprise latching wedges mounted so they are transversely displaceable to the guide sleeves, which penetrate the guide sleeve and the guide spar in oblong holes in the locking position and are supported in the direction of the spar axis on one side on the guide sleeve and on the other side on the guide spar.

Since the axial connection between the granulating head and the cutter head is produced with a sufficient force in the axial direction with the aid of latching wedges, sealing conditions result between the housing and the granulating head or the cutter head, as are provided in the proven flange connections, but have the advantage over these of simpler handling, because the latching wedges must only be displaced transversely to the guide spars. In addition, the tight connection between housing and granulating head or cutter head is maintained, even if the actuator for the latching wedges fails, which is of substantial significance for the operational reliability of such devices.

The cutter head can be arranged in a way known per se in a bearing flange mounted so it is displaceable on the guide spars or can be shifted together with its housing along the guide, which not only provides simple design conditions, but rather also makes the access to the perforated plate of the granulating head easier. In this case, the guide spars can be fastened on the granulating head and the guide sleeves can be fastened on the housing, which provides additional, more favorable conditions with respect to the space conditions. In addition, favorable design conditions can be achieved with respect to the actuation of the latching wedges, if the latching wedges are displaced with the aid of positioning cylinders.

Figure 2:
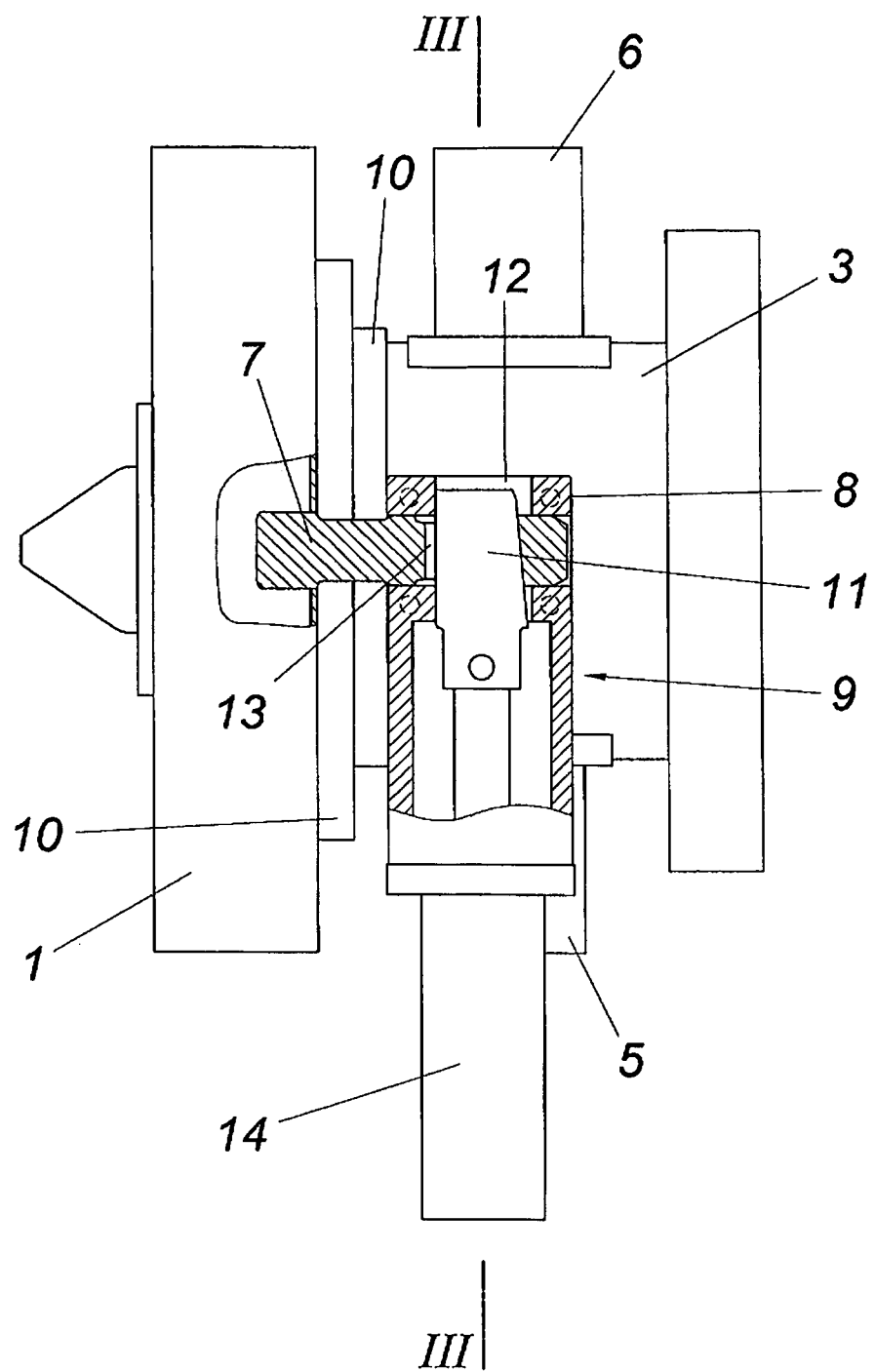
Figure 3:
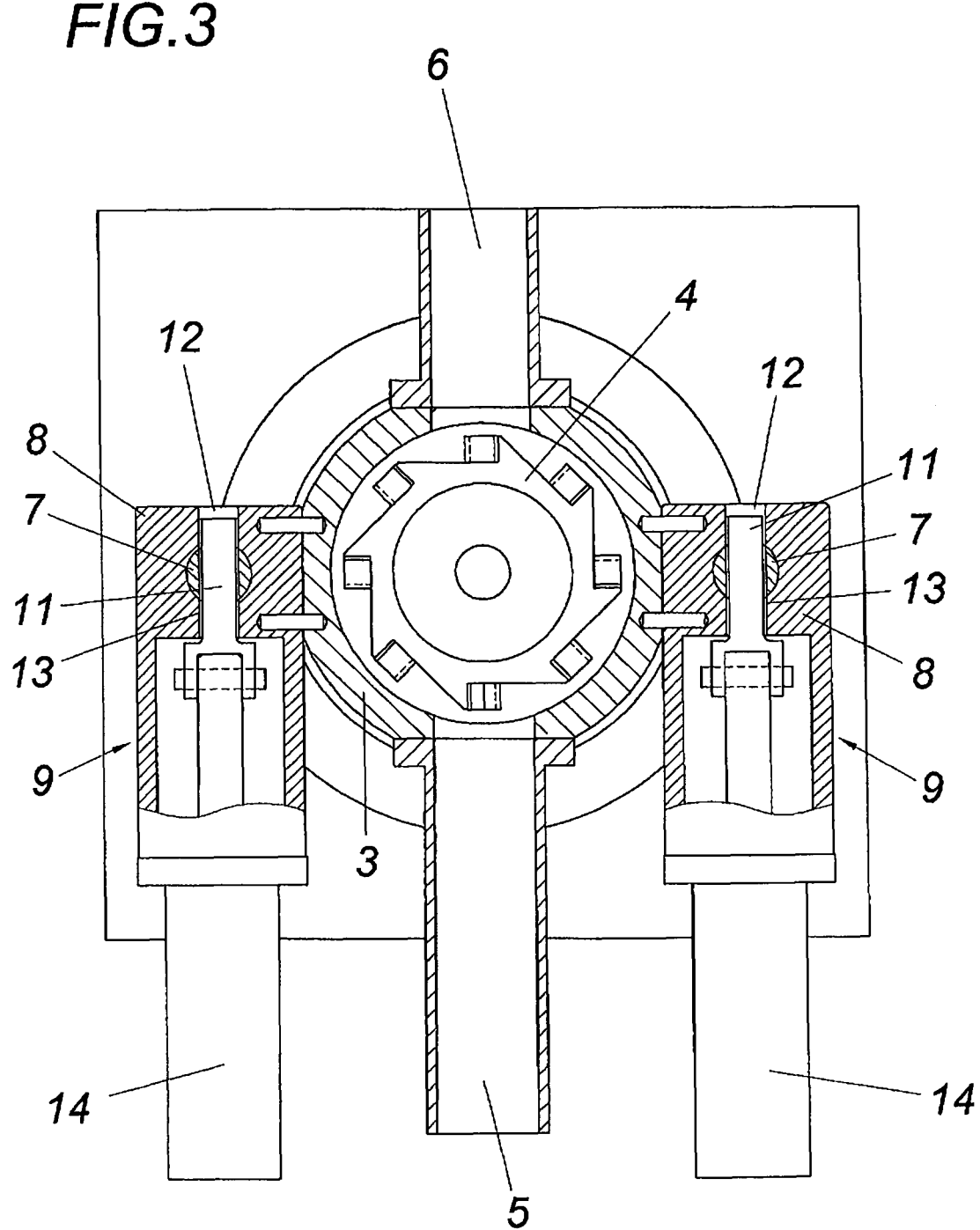

The object of the invention is shown as an example in the drawing. In the figures:

FIG. 1 shows a device according to the invention for granulating plastic in a partially cutaway side view having cutter head removed from the granulating head, FIG. 2 shows the device according to FIG. 1 having cutter head attached to the granulating head, and FIG. 3 shows a section along line III-III of FIG. 2.

The illustrated device has a granulating head 1, which is attached via a diverter valve (not shown) to an extruder, for example. The plastic melt divided into individual strands in the granulating head 1 is expelled in a typical way via dies through a perforated plate 2 into a housing 3, in which a cutter head 4 is mounted so it is rotatable, which chops the individual strands exiting from the perforated plate 2 into the granulated material, which is removed from the housing 3 via a cooling and conveyor medium while simultaneously solidifying, to be subsequently separated from the cooling and conveyor medium via a corresponding separator. The supply and removal lines for the cooling and conveyor medium, for example, water, are identified by 5 and 6. A drive motor, which can be flanged onto the housing 3, but which is not shown for reasons of comprehensibility, however, is used to drive the cutter head 4.

The access to the perforated plate 2 which is necessary for maintenance work requires a disconnection of the cutter head 4 from the granulating head 1. To be able to ensure advantageous design conditions in this context, the cutter head 4 is not pressed to form a seal via a bearing flange against the housing 3 flanged onto the granulating head 1, but rather the housing 3 accommodating the cutter head 4 is pressed against the granulating head 1 to form a seal. For this purpose, the granulating head 1 is preferably provided with guide spars 7 for the housing 3, which are aligned axially parallel to the housing 3 or to the cutter head 4, the housing having corresponding guide sleeves 8 for this purpose. The arrangement is made so that the guide sleeves 8 or the guide spars 7 are diametrically opposite to one another with respect to the cutter head axis. The housing 3 having the cutter head 4 is therefore aligned in relation to the granulating head 1 when the guide sleeves 8 are pushed onto the guide spars 7.

In order that the housing 3 aligned in relation to the granulating head 1 can be tightly connected to the granulating head, locking units 9 are provided, which are active between the guide spars 7 and the guide sleeves 8. For this purpose, the granulating head 1 forms an attachment flange 10 like the housing 3. The correspondingly constructed locking units 9 each comprise a latching wedge 11 mounted so it is displaceable transversely to the guide spars 7, which penetrates the guide sleeve 8 and the guide spar 7 in oblong holes 12, 13 in the locked position according to FIGS. 2 and 3 and is supported in the direction of the spar axis on opposing ends of the oblong holes 12, 13, on one side on the guide sleeve 8 and on the other side on the guide spar 7, so that because of the wedge action of the latching wedges 11, the guide spar 7 is drawn into the guide sleeve 8 and because of this the attachment flange 10 of the housing 3 is pressed against the attachment flange 10 of the granulating head 1. The positioning force for the latching wedges 11 is applied by actuators, which are advantageously implemented in the form of positioning cylinders 14. Because of the solely mechanical locking between the drive head 1 and the housing 3, in spite of the hydraulically-operated actuator, this locking is maintained even in the event of a failure of the hydraulic liquid supply or the activation of the positioning cylinders 14, which represents a substantial condition for high operational reliability.

The invention claimed is:

1. A device for granulating plastic having a granulating head and having a drivable cutter head, which cooperates with a perforated plate and is arranged inside a housing, and which is movable along an axial guide made of guide spars and guide sleeves, in which each guide sleeve is displaceable onto each corresponding guide spar, and in which the cutter head is attachable to the granulating head via locking units, wherein the locking units comprise latching wedges mounted to be displaceable transversely to the guide sleeves, in which each latching wedge penetrates each corresponding guide sleeve and each corresponding guide spar in oblong holes in a locking position and is supported in a direction of a spar axis on opposing ends of the oblong holes, on one side on each guide sleeve and on the other side on each corresponding guide spar, so that the guide spars are drawn into the guide sleeves and an attachment flange of the housing is pressed against a flange attachment of the granulating head; wherein, each guide sleeve and each corresponding guide spar is arranged diametrically opposite to one another with respect to an axis of the cutter head so as to align the housing in relation to the granulating head when the guide sleeves are pushed onto the corresponding guide spars.

2. The device according to claim 1, wherein the guide spars are fastened on the granulating head and the guide sleeves are fastened on the housing accommodating the cutter head.

3. The device according to claim 1, wherein the latching wedges are movable with the aid of positioning cylinders.

\* \* \* \* \*